(12) United States Patent
Lim et al.

(10) Patent No.: US 12,413,747 B2
(45) Date of Patent: Sep. 9, 2025

(54) SUBMESH CODING FOR DYNAMIC MESH CODING

(71) Applicant: SAMSUNG ELECTRONICS CO., LTD., Suwon-si (KR)

(72) Inventors: Youngkwon Lim, Mckinney, TX (US); Rajan Laxman Joshi, San Diego, CA (US); Madhukar Budagavi, Plano, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/391,526

(22) Filed: Dec. 20, 2023

(65) Prior Publication Data

US 2024/0244232 A1 Jul. 18, 2024

Related U.S. Application Data

(60) Provisional application No. 63/438,732, filed on Jan. 12, 2023, provisional application No. 63/439,459, filed on Jan. 17, 2023, provisional application No. 63/440,009, filed on Jan. 19, 2023, provisional application No. 63/442,347, filed on Jan. 31, 2023, provisional application No. 63/459,873, filed on Apr. 17, 2023, provisional application No. 63/542,897, filed on Oct. 6, 2023.

(51) Int. Cl.
 *H04N 19/17* (2014.01)
(52) U.S. Cl.
 CPC .................... *H04N 19/17* (2014.11)

(58) Field of Classification Search
 CPC ...................................................... H04N 19/17
 See application file for complete search history.

(56) References Cited

U.S. PATENT DOCUMENTS 6,563,500 B1    5/2003  Kim et al.
6,850,638 B1 *  2/2005  Lounsbery .............. G06T 17/20
                                                         382/154

(Continued)

FOREIGN PATENT DOCUMENTS

EP          2533202       *  6/2012
KR      10-2313555 B1        10/2021

(Continued)

OTHER PUBLICATIONS

"V-DMC Test Model v2 (TMM v2)" ISO/IEC JTC 1/SC 29/WG 7. MPEG 3D Graphics and Haptics Coding. Dec. 1, 2022.

(Continued)

*Primary Examiner* — Zaihan Jiang
(74) *Attorney, Agent, or Firm* — BROADVIEW IP LAW, PC

(57) ABSTRACT

An apparatus comprises a communication interface and a processor operably coupled to the communication interface. The communication interface is configured to receive a compressed bitstream including association information between scene objects and submeshes. The processor is configured to determine an index of a scene object, decode the association information between scene objects and submeshes, determine an identifier of a submesh based on the association information and the index of the scene object, and reconstruct the submesh based on the identifier.

17 Claims, 12 Drawing Sheets

(56) References Cited

U.S. PATENT DOCUMENTS

| | | | |
|---|---|---|---|
| 8,712,737 B1* | 4/2014 | Hickman | G06T 17/00 |
| | | | 703/2 |
| 10,121,279 B1 | 11/2018 | Sundaram et al. | |
| 10,395,419 B1* | 8/2019 | Godzaridis | G06T 15/30 |
| 10,891,758 B2 | 1/2021 | Hemmer | |
| 11,120,623 B2 | 9/2021 | Jiang et al. | |
| 11,354,861 B1* | 6/2022 | Mason | G06T 17/205 |
| 2007/0239036 A1* | 10/2007 | Herve | G06T 11/006 |
| | | | 600/476 |
| 2009/0005676 A1* | 1/2009 | Koenig | A61B 5/0073 |
| | | | 600/425 |
| 2018/0232849 A1* | 8/2018 | Fuller | G06T 1/60 |
| 2021/0074058 A1* | 3/2021 | Venshtain | G06T 19/003 |
| 2021/0174551 A1* | 6/2021 | Graziosi | G06T 15/08 |
| 2022/0385721 A1* | 12/2022 | Kamaraju | G06T 19/006 |
| 2023/0156177 A1* | 5/2023 | Sato | G06T 7/70 |
| | | | 345/419 |
| 2023/0386133 A1* | 11/2023 | Grossman | G06T 15/005 |

FOREIGN PATENT DOCUMENTS

| | | | |
|---|---|---|---|
| KR | 10-2022-0137548 A | | 10/2022 |
| WO | WO-2020040979 | * | 8/2019 |

OTHER PUBLICATIONS

"WD 1.0 of V-DMC" ISO/IEC JTC 1/SC 29/WG 07. MPEG 3DGH. Nov. 16, 2022.

"Information technology—Coded Representation of Immersive Media—Part 5: Visual Volumetric Video-based Coding (V3C) and Video-based Point Cloud Compression (V-PCC)" ISO/IEC JTC 1/SC 29/WG Nov. 2020.

International Search Report for PCT/KR2024/000552 by Korean Intellectual Property Office dated Apr. 16, 2024.

* cited by examiner

SUBMESH CODING FOR DYNAMIC MESH CODING

CROSS REFERENCE TO RELATED APPLICATION

This application claims benefit of U.S. Provisional Application No. 63/438,732 filed on Jan. 12, 2023, U.S. Provisional Application No. 63/439,459 filed on Jan. 17, 2023, U.S. Provisional Application No. 63/440,009 filed on Jan. 19, 2023, U.S. Provisional Application No. 63/442,347 filed on Jan. 31, 2023, U.S. Provisional Application No. 63/459,873 filed on Apr. 17, 2023, and U.S. Provisional Application No. 63/542,897 filed on Oct. 6, 2023, in the United States Patent and Trademark Office, the entire contents of which are hereby incorporated by reference.

TECHNICAL FIELD

The disclosure relates to dynamic mesh coding, and more particularly to, for example, but not limited to, submesh coding for dynamic mesh coding.

BACKGROUND

Typically mesh encoding and decoding operations may be highly sequential. For base meshes with large number of vertices and high frame rates, a mesh codec such as Draco may have difficulty achieving real-time encoding and decoding. To alleviate this problem, the working draft (WD) 1.0 of the Video-based Dynamic Mesh Coding (V-DMC) has introduced the concept of submeshes. The basic idea is that a base mesh may be divided into multiple submeshes. Since the submeshes may not be mutually exclusive, some vertices and triangles may be common to different submeshes. The submeshes can be encoded and decoded independently without using any information from other submeshes. This can allow multiple instances of a mesh codec to operate in parallel on different submeshes. Furthermore, it enables functionality to perform partial decoding of the mesh by decoding only some of the submeshes present in a V-DMC bitstream. Each decoded submesh may undergo subdivision and then the decoded displacement field may be used to refine the positions of the subdivided points belonging to that submesh.

The creation of submeshes, however, may not be sufficient to ensure the functionality of partial delivery, decoding and reconstruction of the full resolution mesh. As rendering engine decides which part of mesh needs to be decoded and reconstructed according to the context of rendering such as view point of the user and field of view of rendering devices and so on, a mesh may have to be subdivided into submeshes in a way that the appropriate portion of the mesh can be easily identified, delivered, decoded and reconstructed. For example, if a front side of an object needs to be rendered but the mesh is subdivided into a first submesh for a top part of the object, a second submesh for a middle part of the object, and a third submesh for a bottom part of the object according to semantical difference of the portions, then all three submeshes need to be delivered, decoded and reconstructed. So, subdivision of mesh to submeshes does not support partial access of a mesh.

The description set forth in the background section should not be assumed to be prior art merely because it is set forth in the background section. The background section may describe aspects or embodiments of the present disclosure.

SUMMARY

Embodiments propose some methods to subdivide mesh into submeshes so that the portions of mesh according to the area to be rendered can be efficiently identified, delivered, decoded and reconstructed. Embodiments relates to improvements in the ability to perform partial decoding of the V-DMC bitstreams when multiple submeshes are being used.

One embodiment of the present disclosure may provide an apparatus comprising: a communication interface configured to receive a compressed bitstream including association information between scene objects and submeshes, wherein each of the submeshes is independently decodable from other submeshes; and a processor operably coupled to the communication interface. The processor may be configured to determine an index of a scene object, decode the association information between scene objects and submeshes, determine an identifier of a submesh based on the index of the scene object and the association information, and reconstruct the submesh based on the identifier.

In some embodiments, the association information includes a plurality of indices of the scene objects and a plurality of identifiers of the plurality of submeshes each being associated with a respective one index of the plurality of indices of the scene objects.

In some embodiments, the association information further includes first number information indicating a number of scene objects specified in the association information.

In some embodiments, the association information further includes second number information indicating a number of the plurality of identifiers of the plurality of submeshes. In some embodiments, the association information further includes information indicating whether a respective one submesh of the plurality of the submesh is completely included in a scene object associated with the respective one submesh.

In some embodiments, the compressed bitstream further includes 3D bounding box information specifying association between 3D bounding boxes and submeshes, and the index of the scene object is determined based on the 3D bounding box information.

In some embodiments, the compressed bitstream further includes visibility cones information specifying association between visibility cones and submeshes, and the index of the scene object is determined based on the visibility cones information.

In some embodiments, the association information further includes persistence information indicating whether a relationship between the scene objects and submeshes specified by the association information is persistent.

One embodiment of the present disclosure may provide a method comprising receiving a compressed bitstream including association information between scene objects and submeshes; determining an index of a scene object; decoding the association information between scene objects and submeshes; determining an identifier of a submesh based on the index of the scene object and the association information; and reconstructing the submesh based on the identifier.

In some embodiments, the association information includes a plurality of indices of the scene objects and a plurality of identifiers of the plurality of submeshes each being associated with a respective one index of the plurality of indices of the scene objects.

In some embodiments, the association information further includes first number information indicating a number of scene objects specified in the association information.

In some embodiments, the association information further includes second number information indicating a number of the plurality of identifiers of the plurality of submeshes.

In some embodiments, the association information further includes information indicating whether a respective one submesh of the plurality of the submesh is completely included in a scene object associated with the respective one submesh.

In some embodiments, the compressed bitstream further includes 3D bounding box information specifying association between 3D bounding boxes and submeshes, and the index of the scene object is determined based on the 3D bounding box information.

In some embodiments, the compressed bitstream further includes visibility cones information specifying association between visibility cones and submeshes, and the index of the scene object is determined based on the visibility cones information.

In some embodiments, the association information further includes persistence information indicating whether a relationship between the scene objects and submeshes specified by the association information is persistent.

One embodiment of the present disclosure may provide an apparatus comprising a communication interface; and a processor operably coupled to the communication interface. The processor may be configured to divide a base mesh into a plurality of submeshes, encode a submesh of the plurality of submeshes independently from other submeshes, encode association information between scene objects and submeshes, and combine the encoded submesh and the encoded association information into a compressed bitstream.

In some embodiments, the association information includes a plurality of indices of the scene objects and a plurality of identifiers of the plurality of submeshes each being associated with a respective one index of the plurality of indices of the scene objects.

In some embodiments, the compressed bitstream further includes 3D bounding box information specifying association between 3D bounding boxes and submeshes.

In some embodiments, the compressed bitstream further includes visibility cones information specifying association between visibility cones and submeshes.

Figure 1:
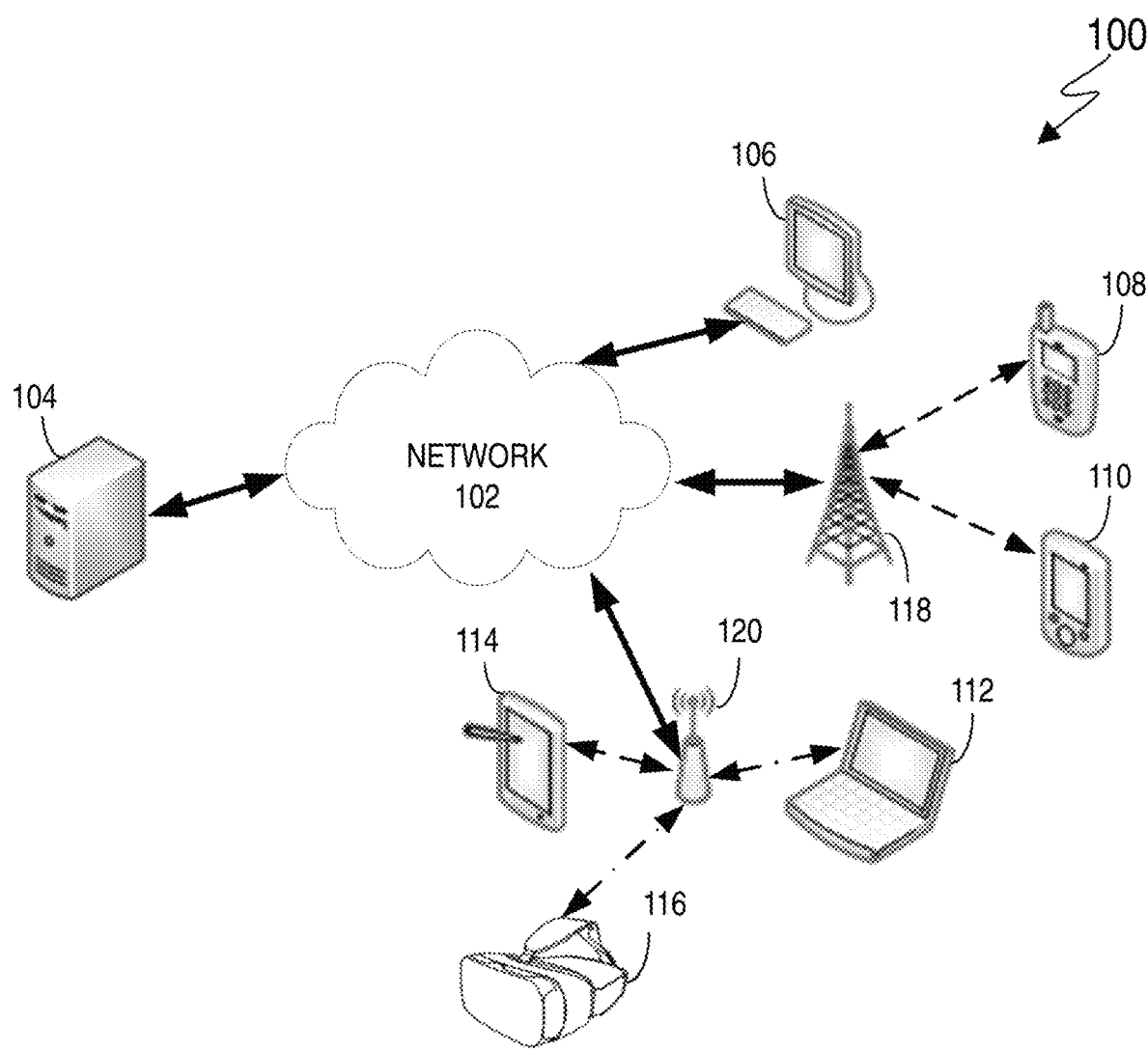
FIG. 1 illustrates an example communication system 100 in accordance with an embodiment of this disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below, in connection with the appended drawings, is intended as a description of various implementations and is not intended to represent the only implementations in which the subject technology may be practiced. Rather, the detailed description includes specific details for the purpose of providing a thorough understanding of the inventive subject matter. As those skilled in the art would realize, the described implementations may be modified in various ways, all without departing from the scope of the present disclosure. Accordingly, the drawings and description are to be regarded as illustrative in nature and not restrictive. Like reference numerals designate like elements.

Three hundred sixty degree (360°) video and 3D volumetric video are emerging as new ways of experiencing immersive content due to the ready availability of powerful handheld devices such as smartphones. While 360° video enables immersive "real life," "being there" experience for consumers by capturing the 360° outside-in view of the world, 3D volumetric video can provide complete 6DoF experience of being and moving within the content. Users can interactively change their viewpoint and dynamically view any part of the captured scene or object they desire. Display and navigation sensors can track head movement of the user in real-time to determine the region of the 360° video or volumetric content that the user wants to view or interact with. Multimedia data that is three-dimensional (3D) in nature, such as point clouds or 3D polygonal meshes, can be used in the immersive environment.

A point cloud is a set of 3D points along with attributes such as color, normal, reflectivity, point-size, etc. that represent an object's surface or volume. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. To compress a 3D object such as a point cloud, often requires specialized hardware. To avoid specialized hardware to compress a 3D point cloud, a 3D point cloud can be transformed into traditional two-dimensional (2D) frames and that can be compressed and later be reconstructed and viewable to a user.

Polygonal 3D meshes, especially triangular meshes, are another popular format for representing 3D objects. Meshes typically consist of a set of vertices, edges and faces that are used for representing the surface of 3D objects. Triangular meshes are simple polygonal meshes in which the faces are simple triangles covering the surface of the 3D object. Typically, there may be one or more attributes associated with the mesh. In one scenario, one or more attributes may be associated with each vertex in the mesh. For example, a texture attribute (RGB) may be associated with each vertex. In another scenario, each vertex may be associated with a pair of coordinates, (u, v). The (u, v) coordinates may point to a position in a texture map associated with the mesh. For example, the (u, v) coordinates may refer to row and column indices in the texture map, respectively. A mesh can be thought of as a point cloud with additional connectivity information.

The point cloud or meshes may be dynamic, i.e., they may vary with time. In these cases, the point cloud or mesh at a particular time instant may be referred to as a point cloud frame or a mesh frame, respectively.

Since point clouds and meshes contain a large amount of data, they require compression for efficient storage and transmission. This is particularly true for dynamic point clouds and meshes, which may contain 60 frames or higher per second.

Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
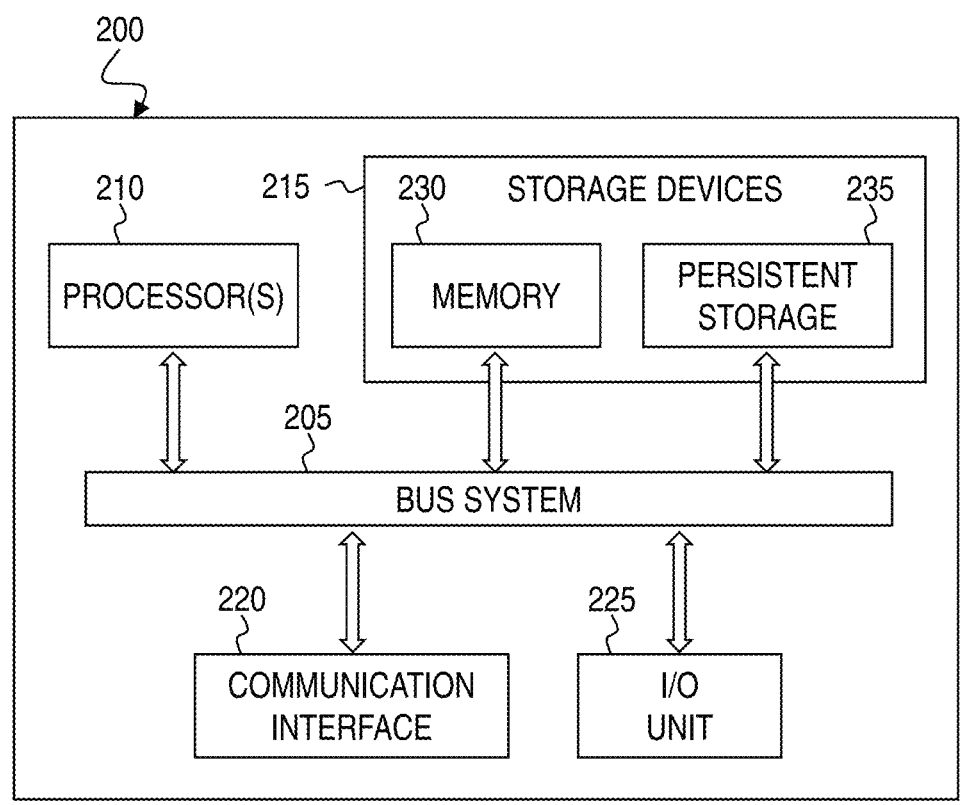
FIGS. 2 and 3 illustrate example electronic devices in accordance with an embodiment of this disclosure.
Figure 3:
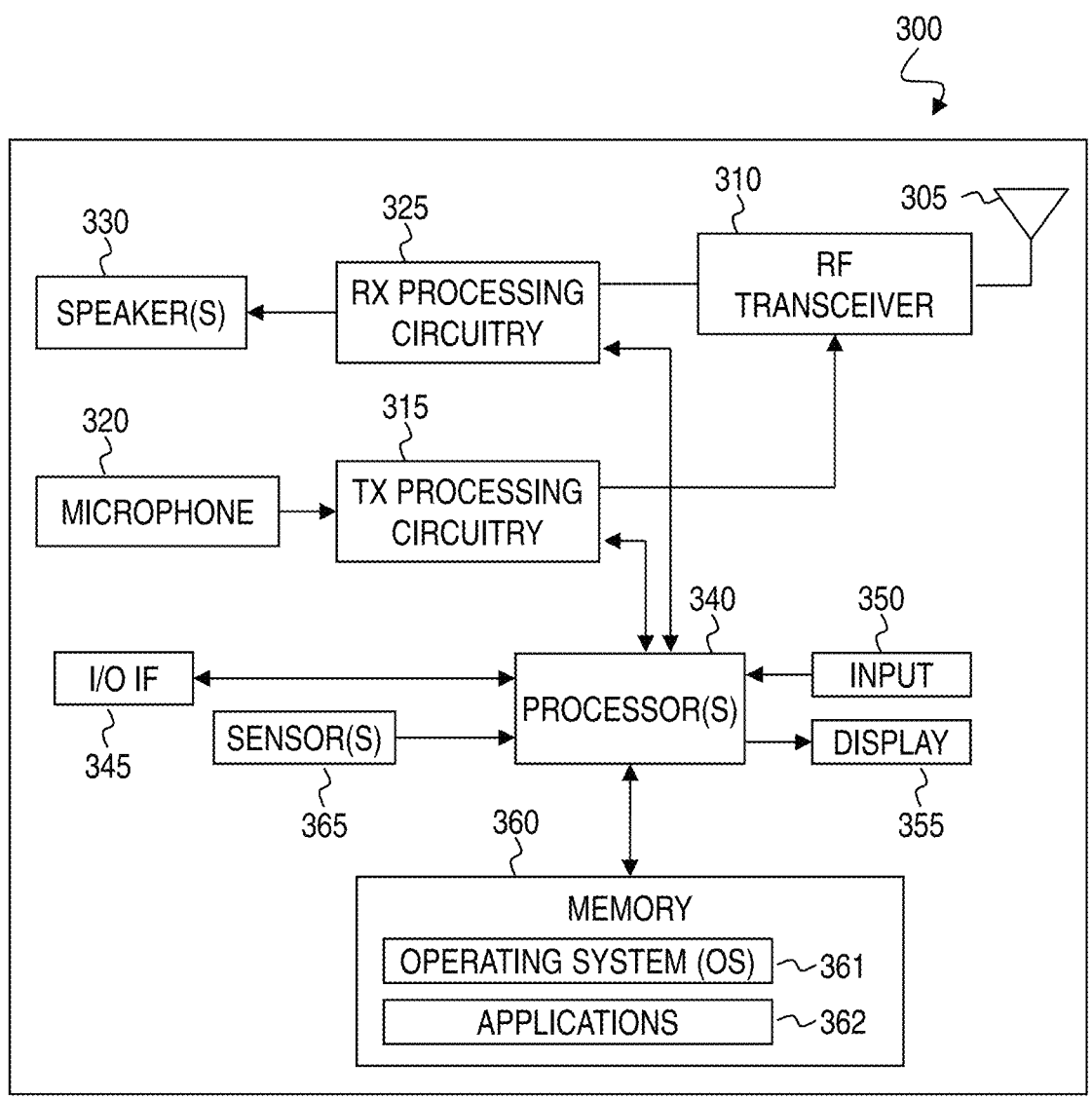

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering the point cloud on an omnidirectional 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
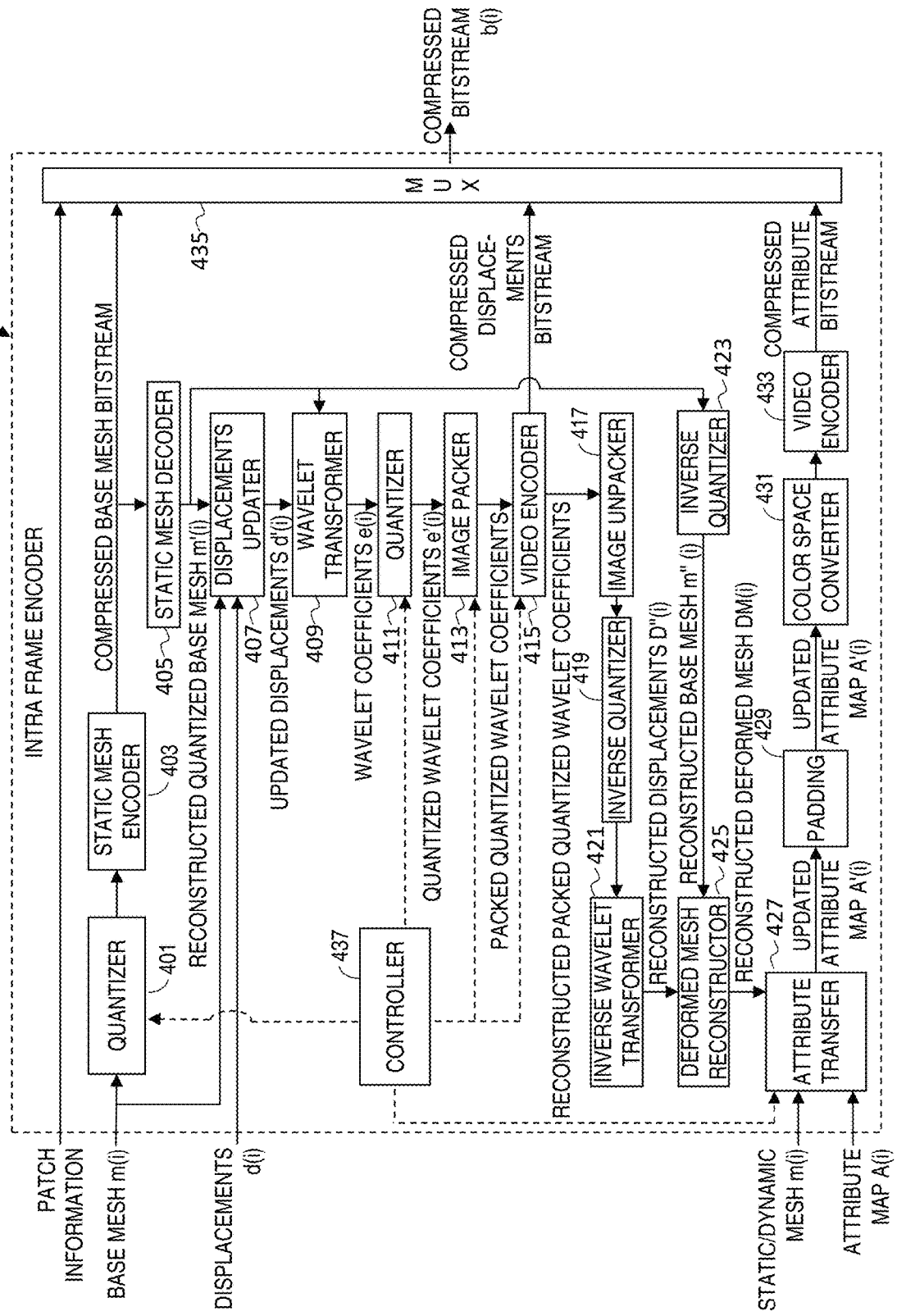
FIG. 4 illustrates a block diagram for an encoder encoding intra frames in accordance with an embodiment.

FIG. 4 illustrates a block diagram for an encoder encoding intra frames in accordance with an embodiment.

As shown in FIG. 4, the encoder 400 encoding intra frames in accordance with an embodiment may comprise a quantizer 401, a static mesh encoder 403, a static mesh decoder 405, a displacements updater 407, a wavelet transformer 409, a quantizer 411, an image packer 413, a video encoder 415, an image unpacker 417, an inverse quantizer 419, an inverse wavelet transformer 421, an inverse quantizer 423, a deformed mesh reconstructor 425, an attribute transfer module 427, a padding module 429, a color space converter 431, a video encoder 433, a multiplexer 435, and a controller 437.

The quantizer 401 may quantize a base mesh m(i) to generate a quantized base mesh. In some embodiments, the base mesh may have fewer vertices compared to an original mesh.

The static mesh encoder 403 may encode and compress the quantized base mesh to generate a compressed base mesh bitstream. In some embodiments, the base mesh may be compressed in a lossy or lossless manner. In some embodiments, an already existing mesh codec such as Draco may be used to compress the base mesh.

The static mesh decoder 405 may decode the compressed base mesh bitstream to generate a reconstructed quantized base mesh m'(i).

The displacements updater 407 may update displacements d(i) based on the base mesh m(i) and the reconstructed quantized base mesh m'(i) to generate updated displacements d'(i). The reconstructed base mesh may undergo subdivision and then a displacement field between the original mesh and the subdivided reconstructed base mesh may be calculated. In inter coding of mesh frame, the base mesh may be coded by sending vertex motions instead of compressing the base mesh directly. In either case, a displacement field may be created. The displacement field as well as the modified attribute map may be coded using a video codec and also included as a part of the V-DMC bitstream.

The wavelet transformer 409 may perform a wavelet transform with the updated displacements d'(i) to generate wavelet coefficients e(i).

The quantizer 411 may quantize the wavelet coefficients e(i) to generate quantized wavelet coefficients e'(i).

The image packer 413 may pack the quantized wavelet coefficients e'(i) into a 2D image to generate packed quantized wavelet coefficients.

The video encoder 415 may encode the packed quantized wavelet coefficients to generate a compressed displacements bitstream.

The image unpacker 417 may unpack the packed quantized wavelet coefficients to generate unpacked quantized wavelet coefficients.

The inverse quantizer 419 may inversely quantize the quantized wavelet coefficients to generate wavelet coefficients.

The inverse wavelet transformer 421 may perform an inverse wavelet transform with the wavelet coefficients to generate reconstructed displacements d"(i).

The inverse quantizer 423 may inversely quantize the reconstructed quantized base mesh m'(i) to generate a reconstructed base mesh m"(i).

The deformed mesh reconstructor 425 may generate a reconstruct deformed mesh DM(i) based on the rereconstructed displacements D"(i) and a reconstructed base mesh m"(i).

The attribute transfer module 427 may update an attribute map A(i) based on a static/dynamic mesh m(i) and a reconstructed deformed mesh DM(i) to generate an updated attribute map A'(i). The attribute map may be a texture map but other attributes may be sent as well.

The padding module 429 may perform padding to fill empty areas in the updated attribute map A'(i) so as to remove high frequency components.

The color space converter 431 may perform a color space conversion of the padded updated attribute map A'(i).

The video encoder 433 may encode the output of the color space converter 431 to generate the compressed attribute bitstream.

The multiplexer 435 may multiplex the compressed base mesh bitstream, the compressed displacements bitstream, and the compressed attribute bitstream to generate a compressed bitstream b(i).

The controller 437 may control modules of the encoder 400.

Figure 5:
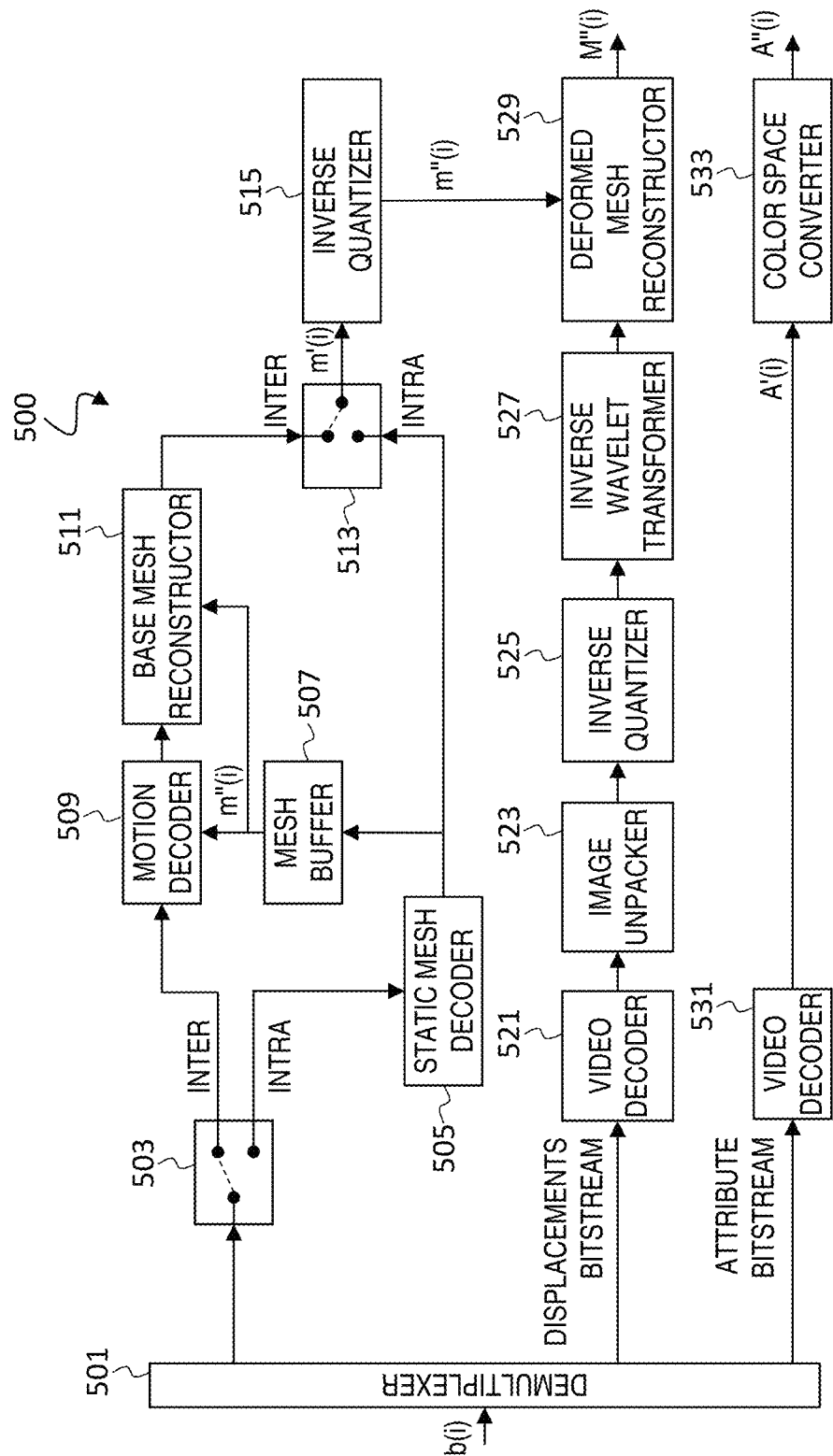
FIG. 5 illustrates a block diagram for a decoder in accordance with an embodiment.

FIG. 5 illustrates a block diagram for a decoder in accordance with an embodiment.

As shown in FIG. 5, the decoder 500 may comprise a demultiplexer 501, a switch 503, a static mesh decoder 505, a mesh buffer 507, a motion decoder 509, a base mesh reconstructor 511, a switch 513, an inverse quantizer 515, a video decoder 521, an image unpacker 523, an inverse quantizer 525, an inverse wavelet transformer 527, a deformed mesh reconstructor 529, a video decoder 531, and a color space converter 533.

The demultiplexer 501 may receive the compressed bitstream b(i) from the encoder 400 to extract the compressed base mesh bitstream, the compressed displacements bitstream, and the compressed attribute bitstream from the compressed bitstream b(i).

The switch 503 may determine whether the compressed base mesh bitstream has an inter-coded mesh frame data or an intra-coded mesh frame data. If the compressed base mesh bitstream has the inter-coded mesh frame data, the switch 503 may transfer the inter-coded mesh frame data to the motion decoder 509. If the compressed base mesh bitstream has the intra-coded mesh frame data, the switch 503 may transfer the intra-coded mesh frame data to the static mesh decoder 507.

The static mesh decoder 505 may decode the intra-coded mesh frame data to generate a reconstructed quantized base mesh frame.

The mesh buffer 507 may store the reconstructed quantized base mesh frames and the inter-coded mesh frame data for future use of decoding subsequent inter-coded mesh frames. The reconstructed quantized base mesh frames may be used as reference mesh frames.

The motion decoder 509 may obtain motion vectors for a current inter-coded mesh frame based on data stored in the mesh buffer 507 and syntax elements in the bitstream for the current inter-coded mesh frame. In some embodiments, the syntax elements in the bitstream for the current inter-coded mesh frame may be a motion vector difference.

The base mesh reconstructor 511 may generate a reconstructed quantized base mesh frame by using syntax elements in the bitstream for the current inter-coded mesh frame based on the motion vectors for the current inter-coded mesh frame.

The switch 513 may transmit the reconstructed quantized base mesh frame from the static mesh decoder 505 to the inverse quantizer 515, if the compressed base mesh bitstream has the intra-coded mesh frame data. The switch 513 may transmit the reconstructed quantized base mesh frame from the static mesh decoder 511 to the inverse quantizer 515, if the compressed base mesh bitstream has the inter-coded mesh frame data.

The inverse quantizer 515 may perform an inverse quantization with the reconstructed quantized base mesh frame to generate a reconstructed base mesh frame m"(i).

The video decoder 521 may decode a displacements bitstream to generate packed quantized wavelet coefficients.

The image unpacker 523 may unpack the packed quantized wavelet coefficients to generate quantized wavelet coefficients.

The inverse quantizer 525 may perform the inverse quantization with quantized wavelet coefficients to generate wavelet coefficients.

The inverse wavelet transformer 527 may perform the inverse wavelet transform with wavelet coefficients to generate displacements.

The deformed mesh reconstructor 529 may reconstruct a deformed mesh based on the displacements and the reconstructed base mesh frame m"(i).

The video decoder 531 may decode the attribute bitstream to generate an attribute map before a color space conversion.

The color space converter 533 may perform a color space conversion of the attribute map from the video decoder 531 to reconstruct the attribute map.

Figure 6:
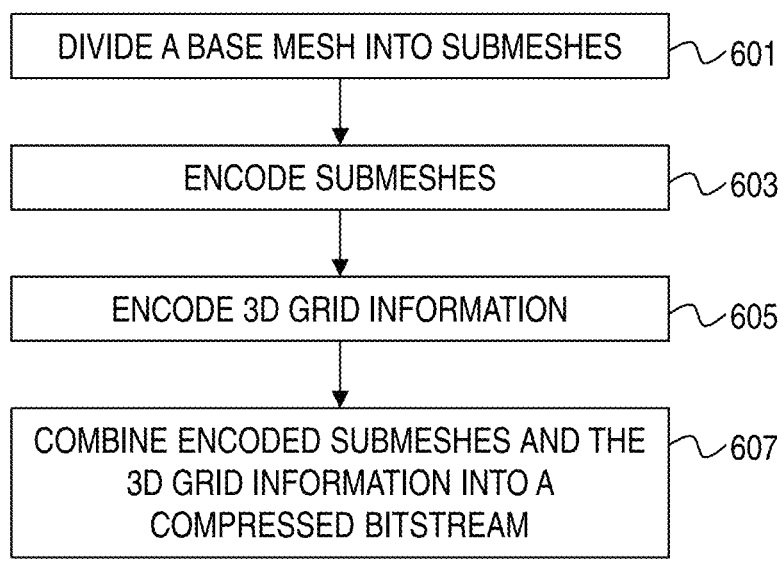
FIG. 6 illustrates a flowchart for an encoder in accordance with an embodiment.

FIG. 6 illustrates a flowchart for an encoder in accordance with an embodiment.

At 601, the encoder may divide a base mesh into a plurality of submeshes based on a linear 3D grid specifying a plurality of cuboids. In some embodiments, each of the plurality of submeshes may be associated with a respective one of the plurality of cuboids.

At 603, the encoder may independently encode the plurality of submeshes to allow the decoder's partial access of the mesh by identifying, delivering, decoding and reconstructing only some of the submeshes present in a V-DMC bitstream. In some embodiments, each of the submeshes may be independently decodable from other submeshes.

At 605, the encoder may encode 3D grid information for the linear 3D grid.

At 607, the encoder may combine the plurality of encoded submeshes and the 3D grid information into a compressed bitstream. In some embodiments, the 3D grid information may be provided in a supplemental enhancement information (SEI) message or a volumetric usability information (VUI) message.

Figure 7:
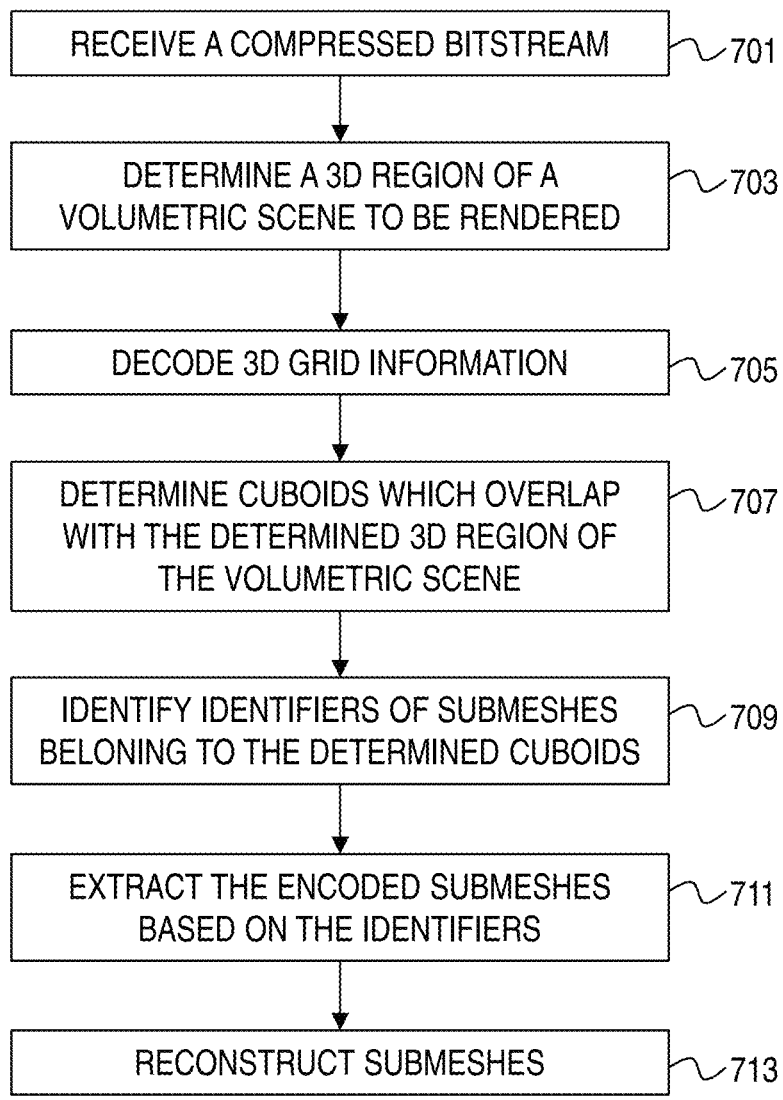
FIG. 7 illustrates a flowchart for a decoder in accordance with an embodiment.

FIG. 7 illustrates a flowchart for a decoder in accordance with an embodiment.

At 701, the decoder may receive a compressed bitstream including a plurality of encoded submeshes and 3D grid information.

At 703, the decoder may determine a 3D region of a volumetric scene to be rendered. In some embodiments, the 3D region of the volumetric scene to be rendered may be determined according to a context of rendering such as view point of the user and a field of view of a rendering device including the decoder.

At 705, the decoder may parse the bitstream and decode 3D grid information for the linear 3D grid specifying a plurality of cuboids.

At 707, the decoder may determine, among the plurality of cuboids specified by the linear 3D grid, one or more cuboids which overlap with the determined 3D region of the volumetric scene based on the decoded 3D grid information.

At 709, the decoder may identify identifiers of one or more submeshes belonging to the determined one or more cuboids. In some embodiments, an identifier of a submesh belonging to a cuboid may be calculated based on the 3D grid information.

At 711, the decoder may extract, from the bitstream, the one or more encoded submeshes based on the identifiers of one or more submeshes.

At 713, the decoder may decode the one or more encoded submeshes to reconstruct the one or more submeshes belonging to the 3D region of the volumetric scene.

Hereinafter, the 3D grid information for the linear 3D grid in accordance with various embodiments will be described with reference to FIG. 8.

Figure 8:
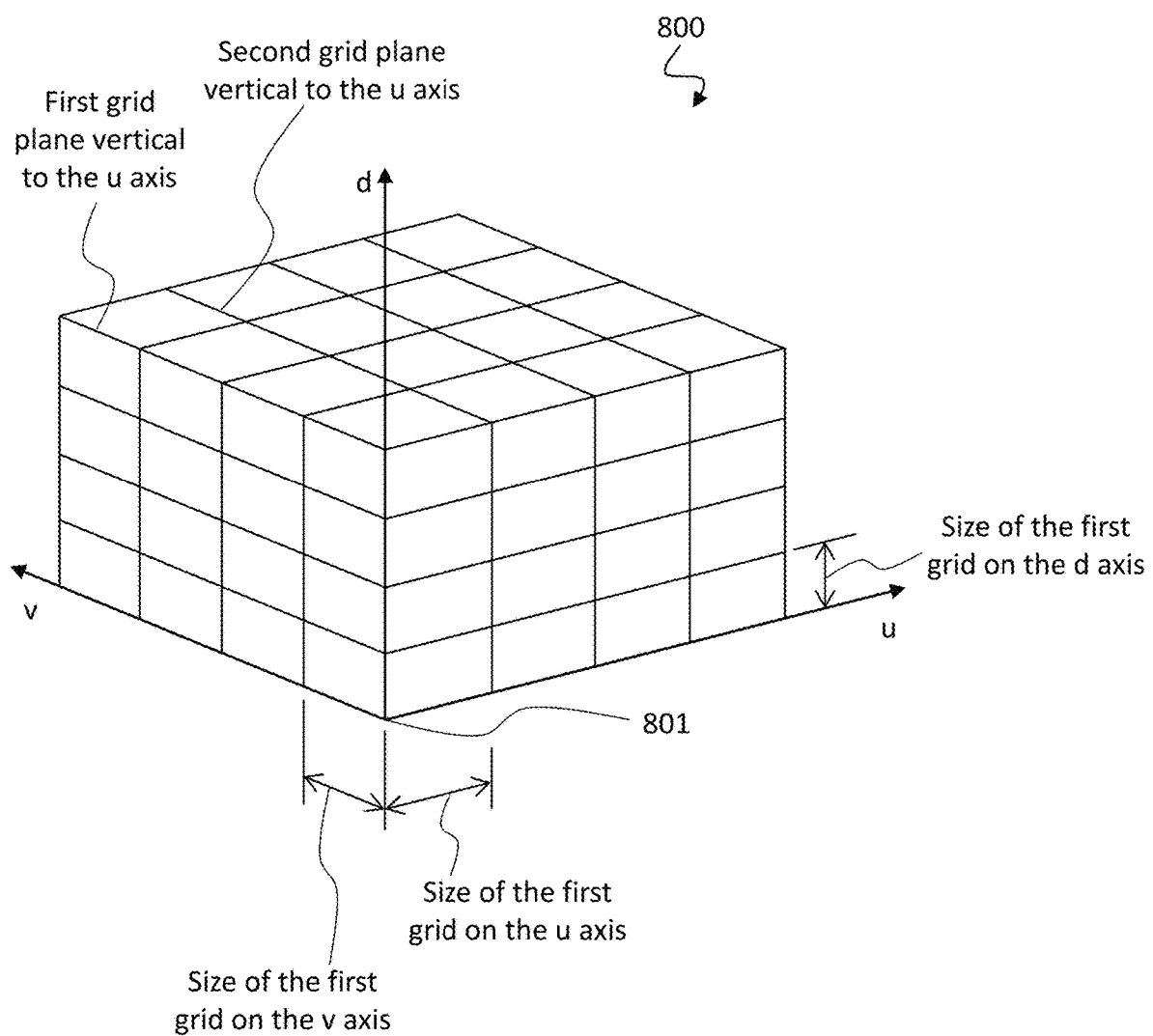
FIG. 8 illustrates a 3D grid in accordance with an embodiment.

FIG. 8 illustrates a 3D grid in accordance with an embodiment.

As shown in FIG. 8, the 3D grid 800 may be defined in the local 3D patch coordinate system (u, v, d). The local 3D patch coordinate system (u, v, d) may be defined by the projection plane with origin O', tangent (u), bi-tangent (v), and normal (d) axes.

In some embodiments, a mesh may be subdivided into submeshes based on a linear 3D grid 800. In some embodiments, the origin position 801 of the 3D grid 800 to be applied to a mesh for subdivision may not be same with the origin position of the mesh. In some embodiments, the origin position 801 of the 3D grid 800 may be decided by a bitstream sender including an encoder which subdivides the mesh and the information about the difference between the origin position of the mesh and the origin position 801 of the 3D grid 800 may be signaled to a bitstream receiver including a decoder which decodes and reconstructs the submeshes.

The structure of the 3D grid 800 on each axis may be decided by the bitstream sender. In some embodiments, the structure of the 3D grid 800 may be uniform. In some embodiments, when the structure of the 3D grid 800 is uniform, the sizes of all grids for all axes may be the same to create a uniform 3D grid and then the single value for the sizes of all grids for all axes may be signaled to the receiver. In some embodiments, the sizes of all grids for each axis may be the same, but the size of grids for one axis may be different from the size of grids for another axis to create a uniform 3D grid, and the size of grid of each axis may be separately signaled to the receiver. In some embodiments, the size of a grid for an axis may be different from the size of another grid for such axis to create a non-uniform 3D grid and the size of each grid of each axis may be individually signaled to the receiver. In some embodiments, information indicating whether the structure of the 3D grid 800 is uniform may be signaled to the receiver. When the structure of the 3D grid 800 is uniform, information indicating whether the size of grids for one axis may be different from the size of grids for another axis may be signaled to the receiver. In some embodiments, when the structure of the 3D grid 800 is uniform, spacing between adjacent grid planes vertical to an axis may be referred to as the size of grids for the axis. In some embodiments, when the structure of the 3D grid 800 is non-uniform, spacing between i-th grid plane and (i+1)-th grid plane vertical to an axis may be referred to as the size of the i-th grid for the axis.

In some embodiments, the location and size of each submesh may be calculated by the receiver according to the origin position of the 3D grid 800 and size information of a grid associated with the submesh.

When each submesh is delivered to the receiver, the location of each submesh may be signaled. For efficient and easy indication of such information, an identifier (ID or id) of submesh can be formulated to indicate its location. In some embodiments, if the total number of grids for x, y, and z axes are l, m, and n respectively, then the id of submeshes located in $a^{th}$, $b^{th}$ and $c^{th}$ grid location on x, y and z axes respectively can be formulated as $c+(b-1)*n+(a-1)*m*n$.

In some embodiments, when a triangle has at least one vertex inside a cuboid defined by the 3D grid 800, all vertices and sides of the triangle may be included in the submesh associated with the cuboid, even though some vertices of the triangle may lie outside the cuboid.

In some embodiment, the shape of grids of all the axes may not be the same and the shape of a grid for one or more axes can be circular or triangular. In this scenario, the basic shape may be something different than a cuboid.

In some embodiments, the subdivision information may be signaled with the syntax as shown in Table 1 by the sender and the receiver may process the syntax elements and recover the subdivision information about the 3D grid 800 applied to subdivision of a mesh into the submeshes.

TABLE 1

```
submesh_division_by_grid_flag
if( submesh_division_by_grid_flag == true){
  submesh_division_grid_type
  submesh_division_grid_origin_offset_u
  submesh_division_grid_origin_offset_v
  submesh_division_grid_origin_offset_d
  if( submesh_division_grid_type == uniform){
    submesh_division_with_same_grid_size
    if( submesh_division_with_same_grid_size == true)
      submesh_division_grid_size_single
    else( submesh_division_with_same_grid_size == false){
      submesh_division_grid_size_u
      submesh_division_grid_size_v
      submesh_division_grid_size_d
    }
  }
  else if ( submesh_division_grid_type == non_uniform){
    submesh_division_grid_count_u
    for( l = 0; l < submesh_division_grid_count_u; l++ )
      submesh_division_grid_size_u[l]
    submesh_division_grid_count_v
    for( m = 0; m < submesh_division_grid_count_v; m++ )
      submesh_division_grid_size_v[m]
    submesh_division_grid_count_d
    for( n = 0; n < submesh_division_grid_count_d; n++ )
      submesh_division_grid_size_d[n]
  }
}
```

The syntax element submesh_division_by_grid_flag may indicate whether the structured 3D grid has been applied to subdivide a mesh into the submeshes. The syntax element submesh_division_by_grid_flag equal to 1 may indicate that the 3D grid has been applied to subdivide a mesh into the submeshes. The syntax element submesh_division_by_grid_flag equal to 0 may indicate that the 3D grid has not been applied to subdivide a mesh into the submeshes.

The syntax element submesh_division_grid_type may indicate whether a structure of the 3D grid is uniform or non-uniform.

The syntax element submesh_division_grid_origin_u may indicate the u coordinate value of the origin position of the 3D grid against to the origin position of the mesh. The syntax element submesh_division_grid_origin_v may indicate the v coordinate value of the origin position of the 3D grid against to the origin position of the mesh. The syntax element submesh_division_grid_origin_d may indicate the d coordinate value of the origin position of the 3D grid against to the origin position of the mesh.

The syntax element submesh_division_with_same_grid_size may indicate that the size of all grids of all axes are same or not.

The syntax element submesh_division_grid_size_single may indicate that the single value of grids to be applied to all axes when the sizes of all grids of all axes are the same.

The syntax element submesh_division_grid_size_u[l] may indicate the size of the l-th grid on the u axis. The syntax element submesh_division_grid_size_v[m] may indicate the size of the m-th grid on the v axis. The syntax element submesh_division_grid_size_d[n] may indicate the size of the n-th grid on the d axis.

The syntax element submesh_division_grid_count_u may indicate the total number of grids for the u axis. The syntax element submesh_division_grid_count_v may indicate the number total of grids for the u axis. The syntax element submesh_division_grid_count_d may indicate the total number of grids for the u axis. In some embodiments, the total number of defined grid planes vertical to an axis minus 1 may be referred to as the total number of grids for the axis.

Figure 9:
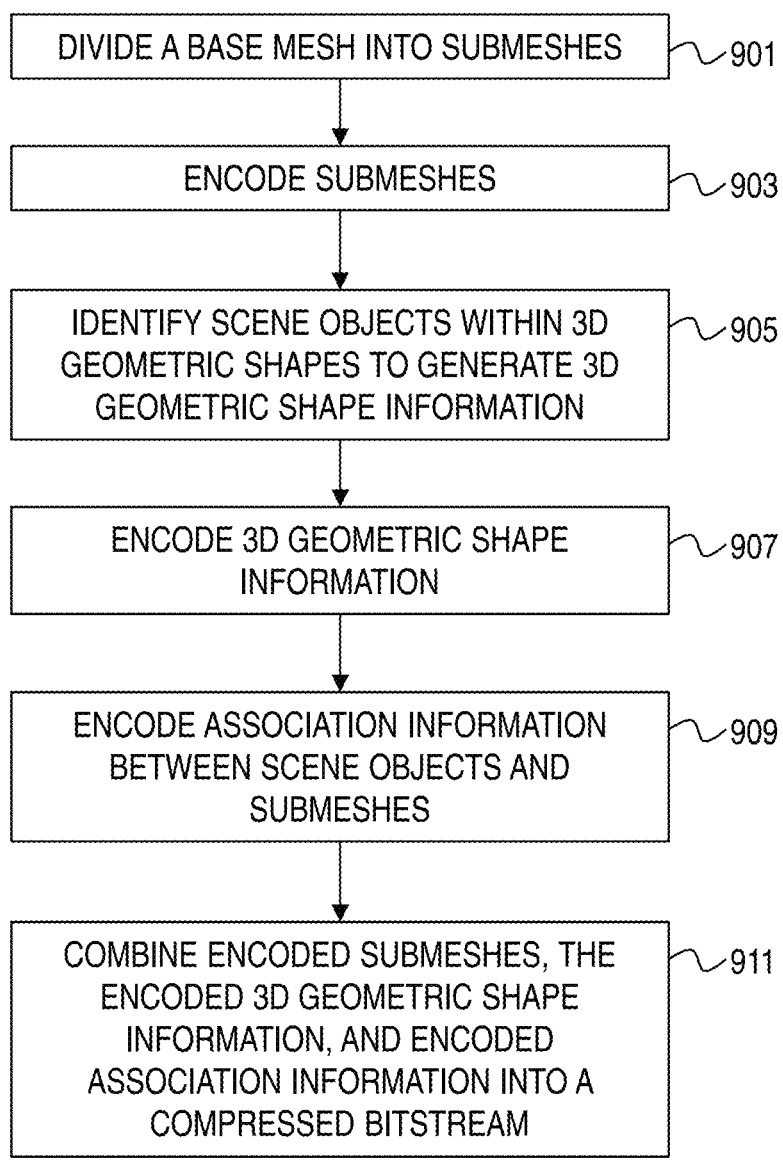
FIG. 9 illustrates a flowchart for an encoder in accordance with an embodiment.

FIG. 9 illustrates a flowchart for an encoder in accordance with an embodiment.

At 901, the encoder may divide a base mesh into a plurality of submeshes.

At 903, the encoder may independently encode the plurality of submeshes to allow the decoder's partial access of the mesh by identifying, delivering, decoding and reconstructing only some of the submeshes present in a V-DMC bitstream. In some embodiments, each of the submeshes may be independently decodable from other submeshes.

At 905, the encoder may identify scene objects within a plurality of 3D geometric shapes to generate 3D geometric shape information specifying association between a plurality of 3D geometric shapes and a plurality of scene objects. In some embodiments, the 3D geometric shape may be a visibility cone or a 3D bounding box.

At 907, the encoder may encode the 3D geometric shape information specifying association between a plurality of 3D geometric shape and a plurality of scene objects.

At 909, the encoder may encode association information between the plurality of scene objects and the plurality of submeshes.

At 911, the encoder may combine the plurality of encoded submeshes, the encoded 3D geometric shape information, and encoded association information into a compressed bitstream. In some embodiments, at least one of the encoded 3D geometric shape information or the encoded association information may be provided in a supplemental enhancement information (SEI) message or a volumetric usability information (VUI) message.

Figure 10:
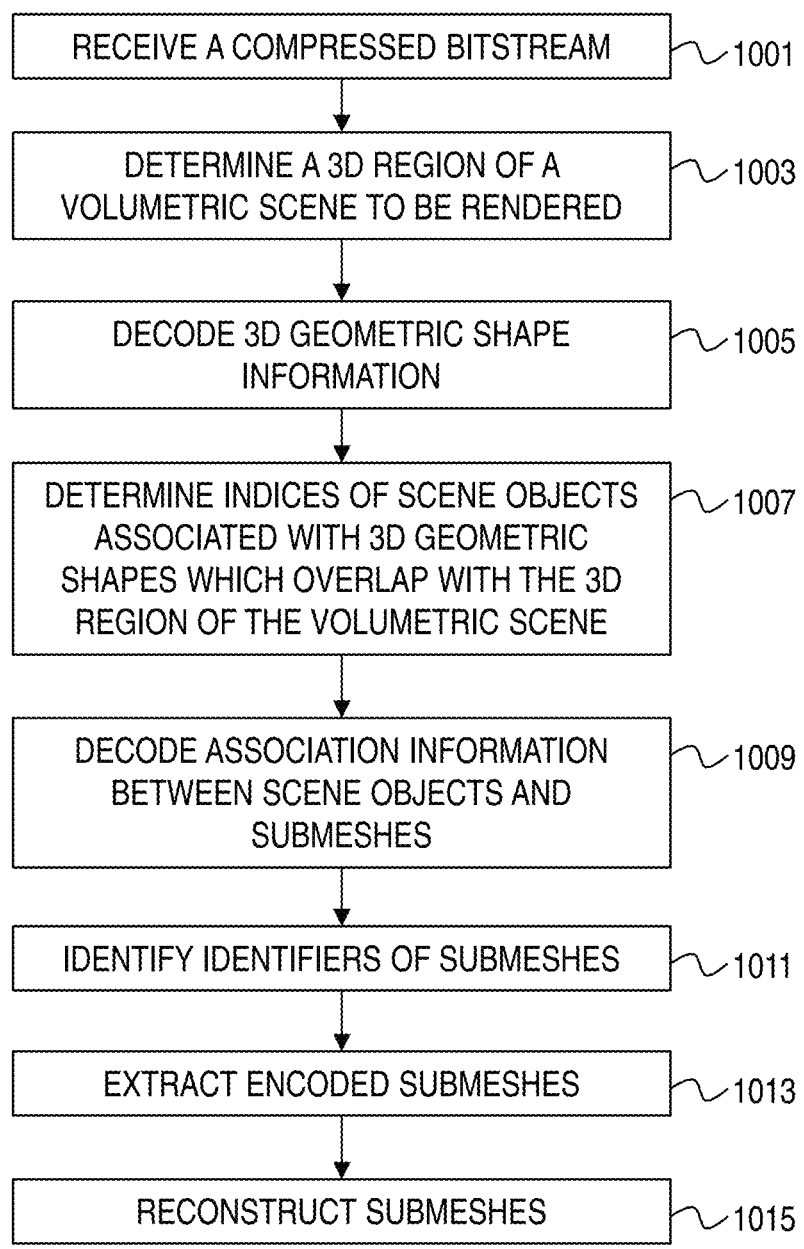
FIG. 10 illustrates a flowchart for a decoder in accordance with an embodiment.

FIG. 10 illustrates a flowchart for a decoder in accordance with an embodiment.

At 1001, the decoder may receive a compressed bitstream including a plurality of encoded submeshes, encoded 3D geometric shape information, and encoded association information.

At 1003, the decoder may determine a 3D region of a volumetric scene to be rendered. In some embodiments, the 3D region of the volumetric scene to be rendered may be determined according to a context of rendering such as view point of the user and a field of view of a rendering device including the decoder.

At 1005, the decoder may parse the bitstream and decode 3D geometric shape information.

At 1007, the decoder may determine one or more indices of one or more scene objects associated with one or more 3D geometric shapes which overlap with the determined 3D region of the volumetric scene based on the 3D geometric shape information.

At 1009, the decoder may parse the bitstream and decode association information between scene objects and submeshes. In some embodiments, by defining scene objects and associating them with submeshes, bounding boxes of submeshes in the 3D coordinate system can be known indirectly and such information can be utilized for partial access of mesh.

At 1011, the decoder may identify identifiers of one or more submeshes belonging to the determined scene objects based on the association information and the determined one or more indices of one or more scene objects.

At 1013, the decoder may extract, from the bitstream, one or more encoded submeshes belonging to the determined scene objects based on the identifiers.

At 1015, the decoder may decode the one or more encoded submeshes to reconstruct the one or more submeshes belonging to the 3D region of the volumetric scene.

Hereinafter, the 3D geometric shape information in accordance with various embodiments will be described.

In some embodiments, the 3D geometric shape information may comprise the 3D bounding box information, visibility cones information, or both. One or more 3D geometric shapes specified by the 3D geometric shape information may comprise at least one of one or more 3D bounding boxes or one or more visibility cones. In some embodiments, a volume defined as a cuboid solid having six rectangular faces placed at right angles may be referred to as the 3D bounding box.

In some embodiments, the 3D geometric shape information may comprise information for a plurality of 3D geometric shapes. Each of the plurality of 3D geometric shapes may be associated with a respective one of a plurality of scene objects. In some embodiments, a respective one of scene objects may have one or more complete submeshes. In some embodiments, a respective one of scene objects may contain subset of one or more submeshes. Information for a respective one 3D geometric shape of the plurality of 3D geometric shapes may comprise index information indicating an index of a scene object associated with the respective one 3D geometric shape. Information for a respective one 3D geometric shape of the plurality of 3D geometric shapes may further comprise information indicating a 3D region of the respective one 3D geometric shape. Information indicating the region of the respective one 3D geometric shape may comprise an origin and a size of the respective one 3D geometric shape. Thus, in some embodiments, the 3D geometric shape information may comprise region information of the plurality of 3D geometric shapes and association information between the plurality of 3D geometric shapes and the plurality of scene objects.

In some embodiments, the 3D geometric shape information may be provided in a supplemental enhancement information (SEI) message or a volumetric usability information (VUI) message. The scene object information SEI message comprising the 3D bounding box information and the visibility cones information is shown in Table 2.

TABLE 2

| | Descriptor |
|---|---|
| scene_object_information( payloadSize ) { | |
|   soi_num_object_updates | ue(v) |
|   ... | |
|   soi_visibility_cones_present_flag | u(1) |
|   soi_3d_bounding_box_present_flag | u(1) |
|   ... | |

TABLE 2-continued

| | Descriptor |
|---|---|
|   for( i = 0; i < soi_num_object_updates; i++ ) { | |
|     soi_object_idx[ i ] | u(v) |
|     if( soi_visibility_cones_present_flag ) { | |
|       soi_visibility_cones_update_flag[ k ] | u(1) |
|       if( soi_visibility_cones_update_flag[ k ]) { | |
|         soi_direction_x[ k ] | i(16) |
|         soi_direction_y[ k ] | i(16) |
|         soi_direction_z[ k ] | i(16) |
|         soi_angle[ k ] | u(16) |
|       } | |
|     } | |
|     if( soi_3d_bounding_box_present_flag ) { | |
|       soi_3d_bounding_box_update_flag[ k ] | u(1) |
|       if( soi_3d_bounding_box_update_flag[ k ]) { | |
|         soi_3d_bounding_box_x[ k ] | ue(v) |
|         soi_3d_bounding_box_y[ k ] | ue(v) |
|         soi_3d_bounding_box_z[ k ] | ue(v) |
|         soi_3d_bounding_box_size_x[ k ] | ue(v) |
|         soi_3d_bounding_box_size_y[ k ] | ue(v) |
|         soi_3d_bounding_box_size_z[ k ] | ue(v) |
|       } | |
|     } | |
|   } | |
| } | |

The soi_num_object_updates may indicate the number of objects that are to be updated by the current SEI message.

The syntax element soi_visibility_cones_present_flag may indicate that visibility cones information is present in the current scene object information SEI message. The syntax element soi_visibility_cones_present_flag equal to 1 may indicate that visibility cones information is present in the current scene object information SEI message. The syntax element soi_visibility_cones_present_flag equal to 0 may indicate that visibility cones information is not present.

The syntax element soi_3d_bounding_box_present_flag may indicate whether the 3D bounding box information is present in the current scene object information SEI message. The syntax element soi_3d_bounding_box_present_flag equal to 1 may indicate that 3D bounding box information is present in the current scene object information SEI message. The syntax element soi_3d_bounding_ box_present_flag equal to 0 may indicate that 3D bounding box information is not present.

The syntax element soi_visibility_cones_update_flag[i] may indicate whether visibility cones update information is present for an object with object index i. The syntax element soi_visibility_cones_update_flag[i] equal to 1 may indicate that visibility cones update information is present for an object with object index i. The syntax element soi_visibility_cones_update_flag[i] equal to 0 indicates that visibility cones update information is not present.

The syntax element soi_object_idx[i] may indicate the object index of the i-th object to be updated.

The syntax element soi_direction_x[i] may specify the normalized x-component value, ObjectVisibilityDirectionX [i], of the direction vector for the visibility cone of an object with object index i. The value of soi_direction_x[i] may be in the range of $-2^{14}$ to $2^{14}$, inclusive. The default value of soi_direction_x[i] may be equal to $2^{14}$.

The syntax element soi_direction_y[i] may specify the normalized y-component value, ObjectVisibilityDirectionY [i], of the direction vector for the visibility cone of an object with object index i. The value of soi_direction_y[i] may be in the range of $-2^{14}$ to $2^{14}$, inclusive. The default value of soi_direction_y[i] may be equal to $2^{14}$.

The syntax element soi_direction_z[i] may specify the normalized z-component value, ObjectVisibilityDirectionZ

[i], of the direction vector for the visibility cone of an object with object index i. The value of soi_direction_z[i] may be in the range of $-2^{14}$ to $2^{14}$, inclusive. The default value of soi_direction_z[i] may be equal to $2^{14}$.

The syntax element soi_3d_bounding_box_update_flag[i] may indicate whether the 3D bounding box information is present for an object with object index i. The syntax element soi_3d_bounding_box_update_flag[i] equal to 1 may indicate that 3D bounding box information s present for an object with object index i. The syntax element soi_3d_bounding_box_update_flag[i] equal to 0 may indicate that 3D bounding box information is not present.

The syntax element soi_3d_bounding_box_x[i] may specify the quantized x coordinate value of the origin position of the 3D bounding box of an object with index i. The default value of soi_3d_bounding_box_x[i] may be equal to 0.

The syntax element soi_3d_bounding_box_y[i] may specify the quantized y coordinate value of the origin position of the 3D bounding box of an object with index i. The default value of soi_3d_bounding_box_y[i] may be equal to 0.

The syntax element soi_3d_bounding_box_z[i] may specify the quantized z coordinate value of the origin position of the 3D bounding box of an object with index i. The default value of soi_3d_bounding_box_z[i] may be equal to 0.

The syntax element soi_3d_bounding_box_size_x[i] may specify the quantized size of the bounding box on the x axis of an object with index i. The default value of soi_3d_bounding_box_size_x[i] may be equal to 0.

The syntax element soi_3d_bounding_box_size_y[i] specifies the quantized size of the bounding box on the y axis of an object with index i. The default value of soi_3d_bounding_box_size_y[i] may be equal to 0.

The syntax element soi_3d_bounding_box_size_z[i] may specify the quantized size of the bounding box on the z axis of an object with index i. The default value of soi_3d_bounding_box_size_z[i] may be equal to 0.

The size of a respective one 3D bounding box can be uniform for entire 3D object or specific to a scene object associated with the respective one 3D bounding box.

The descriptor u(n) may indicate an unsigned integer using n bits. the descriptor i(n) may indicate a signed integer using n bits. When n is "v" in the syntax table, the number of bits may vary in a manner dependent on the value of other syntax elements. The descriptor ue(v) may indicate an unsigned integer 0-th order Exp-Golomb-coded syntax element with the left bit first.

Hereinafter, the association information between scene objects and submeshes in accordance with various embodiments will be described.

In some embodiments, the association information between scene objects and submeshes may be included in SEI messages and the syntax and semantics for such SEI messages is shown in Table 3.

TABLE 3

```
number_of_active_scene_object
for( i=0 ; i<number_of_active_scene_object ; i++){
    soi_object_idx
    number_of_submesh_included
    for( j=0 ; j<number_of_submesh_included ; j++){
        submesh_id
    }
}
```

In Table 3, the syntax element number_of_active_scene_object may indicate the number of active scene objects defined for a mesh at the time of the SEI message is signaled. The syntax element soi_object_idx may indicate the index of the scene object to be associated with a plurality of submeshes. The syntax element number_of_submesh_included may indicate the number of a plurality of submeshes fully included in the current scene object with an index indicated by the syntax element soi_object_idx. The syntax element submesh_id may indicate the identifier of a submesh associated with the current scene object with an index indicated by the syntax element soi_object_idx. In this scenario, submeshes with identifiers indicated by syntax elements submesh_id associated with the syntax element soi_object_idx may be completely included in a scene object with an index indicated by the syntax element soi_object_idx.

In some embodiments, the association information between scene objects and submeshes may be included in SEI messages and the syntax and semantics for such SEI messages is shown in Table 4.

TABLE 4

```
persistence_association_flag
number_of_active_scene_object
for( i=0 ; i<number_of_active_scene_object ; i++){
    soi_object_idx
    number_of_submesh_included
    for( j=0 ; j<number_of_submesh_included ; j++){
        submesh_id
        completely_included
    }
}
```

In Table 4, the syntax element persistence_association_flag may indicate the relationship between the scene objects and submeshes is persistent. The syntax element persistence_association_flag equal to 0 may indicate that the relationship is only valid for the current frame. The syntax element number_of_active_scene_object may indicate the number of active scene objects defined for a mesh at the time of the SEI message is signaled. The syntax element soi_object_idx may indicate the index of the scene object to be associated with a plurality of submeshes. The syntax element number_of_submesh_included may indicate the number of a plurality of submeshes fully included in the current scene object with an index indicated by the syntax element soi_object_idx. The syntax element submesh_id may indicate the identifier of a submesh associated with the current scene object with an index indicated by the syntax element soi_object_idx. The syntax element completely_included may indicate whether the submesh in this loop is completely included in the current scene object with an index indicated by the syntax element soi_object_idx. In some embodiments, the syntax element completely_included flag may not be present.

In some embodiments, the association information may be included in SEI messages and the syntax and semantics for such SEI messages is shown in Table 5.

TABLE 5

| | Descriptor |
| --- | --- |
| submesh_soi_relationship_indication ( payloadSize ) { | |
|   persistence_association_flag | u(1) |
|   number_of_active_scene_objects | ue(v) |
|   submesh_id_length_minus1 | ue(v) |

TABLE 5-continued

|  | Descriptor |
|---|---|
| for(i=0 ; i<number_of_active_scene_object ; i++) { | |
|   soi_object_idx | u(v) |
|   number_of_submesh_included | ue(v) |
|   for(( j=0 ; j<number_of_submesh_included ; j++) { | |
|     submesh_id | u(v) |
|     completely_included | u(1) |
|   } | |
| } | |
| } | |

In Table 5, the syntax element persistence_association_flag may indicate the relationship between the scene objects and submeshes is persistent. The syntax element persistence_association_flag equal to 0 may indicate that the relationship is only valid for the current frame. The syntax element number_of_active_scene_object may indicate the number of active scene objects defined for a mesh at the time of the SEI message is signaled. The syntax element submesh_id_length_minus1 plus 1 may specify the number of bits used to represent the syntax element pdu_submesh_id in a patch data unit. The syntax element soi_object_idx may indicate the index of the scene object to be associated with a plurality of submeshes. The syntax element number_of_submesh_included may indicate the number of a plurality of submeshes fully included in the current scene object with an index indicated by the syntax element soi_object_idx. The syntax element submesh_id may indicate the identifier of a submesh associated with the current scene object with an index indicated by the syntax element soi_object_idx. The syntax element completely_included may indicate whether the submesh in this loop is completely included in the current scene object with an index indicated by the syntax element soi_object_idx. In some embodiments, the syntax element completely_included flag may not be present.

Referring to embodiments in accordance with FIG. 9 and FIG. 10, instead of creating and signaling submeshes based on the 3D grid, such constraints may be imposed on the submeshes creation. The submeshes may be created based on semantic objects or based on locations in the 3D space. However, for each submesh, a 3D bounding box (or cuboid) that contains the submesh in the 3D coordinate space may be signalled. The origin position of the 3D bounding box may be signalled in terms of x, y, and z coordinates. Additionally, the size of the 3D bounding box in x, y, and z direction (size_x, size_y, and size_z, respectively) may be also signalled. In one embodiment, the origin position of the 3D bounding box and size_x, size_y, and size_z may be chosen so that the volume of the 3D bounding box is as minimum as possible while the 3D bounding obx contains all the vertices corresponding to the submesh. At the decoder side, if a renderer is interested in rendering only a part of the 3D space, the decoder may check the 3D bounding box information for each submesh to figure out which submeshes need to be decoded.

Figure 11:
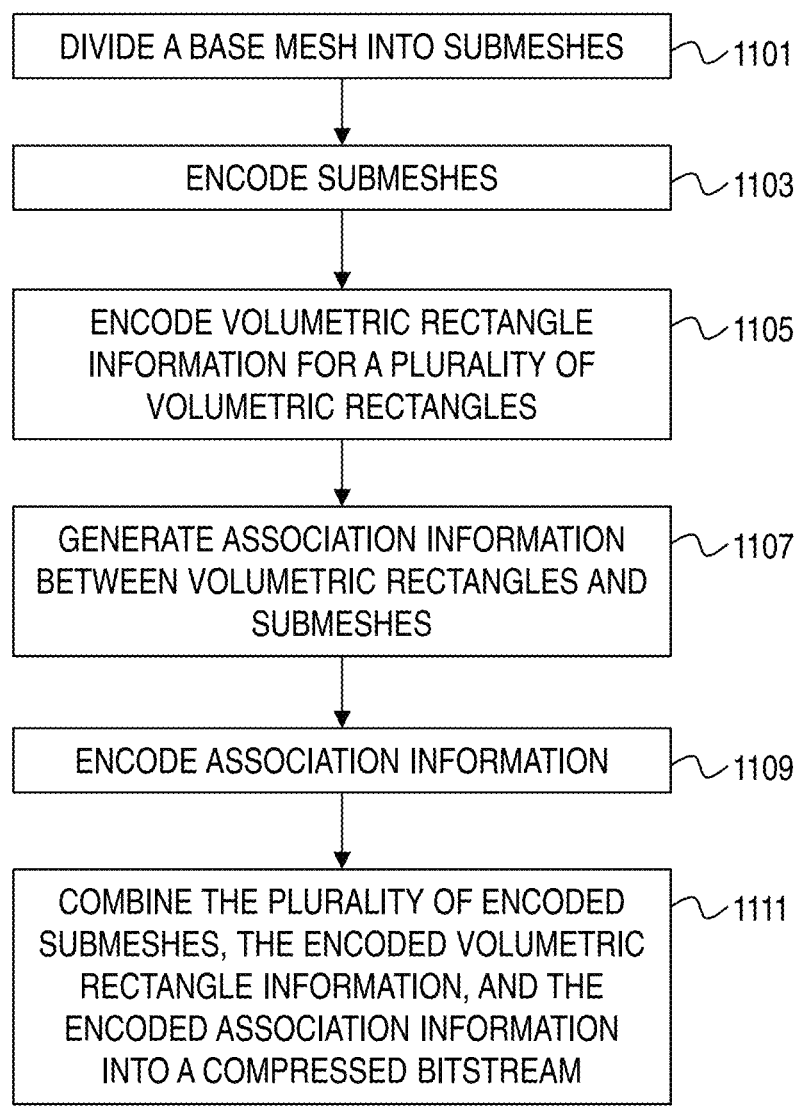
FIG. 11 illustrates a flowchart for an encoder in accordance with an embodiment.

FIG. 11 illustrates a flowchart for an encoder in accordance with an embodiment.

At 1101, the encoder may divide a base mesh into a plurality of submeshes.

At 1103, the encoder may independently encode the plurality of submeshes to allow the decoder's partial access of the mesh by identifying, delivering, decoding and reconstructing only some of the submeshes present in a V-DMC bitstream. In some embodiments, each of the submeshes may be independently decodable from other submeshes.

At 1105, the encoder may encode volumetric rectangle information for a plurality of volumetric rectangles.

At 1107, the encoder may identify submeshes within the plurality of volumetric rectangles to generate association information between a plurality of volumetric rectangles and a plurality of submeshes.

At 1109, the encoder may encode the association information.

At 1111, the encoder may combine the plurality of encoded submeshes, the encoded volumetric rectangle information, and the encoded association information into a compressed bitstream. In some embodiments, at least one of the encoded volumetric rectangle information or the encoded association information may be provided in a supplemental enhancement information (SEI) message or a volumetric usability information (VUI) message.

Figure 12:
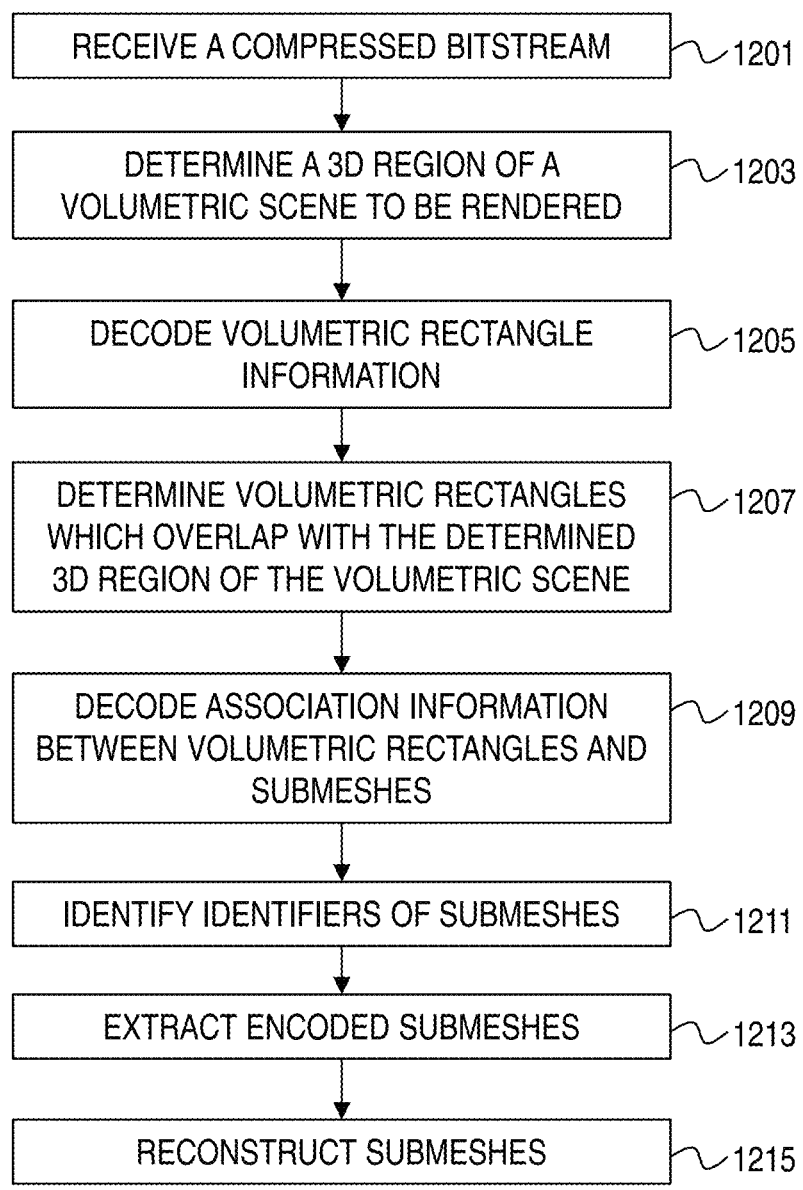
FIG. 12 illustrates a flowchart for a decoder in accordance with an embodiment.

FIG. 12 illustrates a flowchart for a decoder in accordance with an embodiment.

At 1201, the decoder may receive a compressed bitstream including a plurality of encoded submeshes, encoded volumetric rectangle information, and encoded association information.

At 1203, the decoder may determine a 3D region of a volumetric scene to be rendered. In some embodiments, the 3D region of the volumetric scene to be rendered may be determined according to a context of rendering such as view point of the user and a field of view of a rendering device including the decoder.

At 1205, the decoder may parse the bitstream and decode volumetric rectangle information.

At 1207, the decoder may determine one or more volumetric rectangles which overlap with the determined 3D region of the volumetric scene based on the decoded volumetric rectangle information.

At 1209, the decoder may parse the bitstream and decode association information between a plurality of volumetric rectangles and a plurality of submeshes.

At 1211, the decoder may identify identifiers of one or more submeshes belonging to the determined one or more volumetric rectangles based on the association information.

At 1213, the decoder may extract, from the bitstream, one or more encoded submeshes based on the identifiers.

At 1215, the decoder may decode the one or more submeshes to reconstruct the one or more submeshes belonging to the 3D region of the volumetric scene.

Hereinafter, the association information between a plurality of volumetric rectangles and a plurality of submeshes in accordance with various embodiments will be described.

In some embodiments, the association information between volumetric rectangles and submeshes may be included in SEI messages and the syntax and semantics for such SEI messages is shown in Table 6. In some embodiments, one or more submeshes may be completely included in a volumetric rectangle.

TABLE 6

| |
|---|
| number_of_active_voluetric_rectangle |
| for( i=0 ; i<number_of_active_volumetric rectangle ; i++){ |
|   vri_rectangle_idx |
|   number_of_submesh_included |
|   for( j=0 ; j<number_of_submesh_included ; j++){ |
|     submesh_id |
|   } |
| } |

The syntax element number_of_active_volumetric_rectangle may indicate the number of active volumetric rectangles defined for a mesh at the time when SEI message is signaled. The syntax element vri_rectangle_idx may indicate the index of the volumetric rectangle to be associated with the submeshes. The syntax element number_of_submesh_included may indicate the number of submeshes fully included in the current volumetric rectangle. The syntax element submesh_id may indicate the identifier of a submesh.

The various illustrative blocks, units, modules, components, methods, operations, instructions, items, and algorithms may be implemented or performed with a processing circuitry.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The term "exemplary" is used to mean serving as an example or illustration. To the extent that the term "include," "have," "carry," "contain," or the like is used, such term is intended to be inclusive in a manner similar to the term "comprise" as "comprise" is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously or may be performed as a part of one or more other steps, operations, or processes. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The embodiments are provided solely as examples for understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of this invention.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for reconstructing a three-dimensional (3D) sub-mesh of a 3D mesh comprising a processor configured to:
receive a compressed bitstream including a supplemental enhancement information (SEI) message including association information between scene objects and submeshes, wherein the association information includes a plurality of indices of the scene objects and a plurality of identifiers of the plurality of submeshes each being associated with a respective one index of the plurality of indices of the scene objects and each of the submeshes is independently decodable from other submeshes;
determine an index of the scene object;
decode the SEI message to obtain the association information between scene objects and submeshes;
determine an identifier of a submesh based on the index of the scene object and the association information; and
reconstruct the submesh based on the identifier.

2. The apparatus of claim 1, wherein the association information further includes first number information indicating a number of scene objects specified in the association information.

3. The apparatus of claim 2, wherein the association information further includes second number information indicating a number of the plurality of identifiers of the plurality of submeshes.

4. The apparatus of claim 3, wherein the association information further includes information indicating whether a respective one submesh of the plurality of the submesh is completely included in a scene object associated with the respective one submesh.

5. The apparatus of claim 1, wherein the compressed bitstream further includes 3D bounding box information specifying association between 3D bounding boxes and submeshes, and
the index of the scene object is determined based on the 3D bounding box information.

6. The apparatus of claim 1, wherein the compressed bitstream further includes visibility cones information specifying association between visibility cones and submeshes, and the index of the scene object is determined based on the visibility cones information.

7. The apparatus of claim 1, wherein the association information further includes persistence information indicating whether a relationship between the scene objects and submeshes specified by the association information is persistent.

8. A method for reconstructing a three-dimensional (3D) sub-mesh of a 3D mesh comprising:
receiving a compressed bitstream including a supplemental enhancement information (SEI) message including association information between scene objects and submeshes, wherein the association information includes a plurality of indices of the scene objects and a plurality of identifiers of the plurality of submeshes each being associated with a respective one index of the plurality of indices of the scene objects;
determining an index of the scene object;
decoding the SEI message to obtain the association information between scene objects and submeshes;
determining an identifier of a submesh based on the index of the scene object and the association information; and
reconstructing the submesh based on the identifier.

9. The method of claim 8, wherein the association information further includes first number information indicating a number of scene objects specified in the association information.

10. The method of claim 9, wherein the association information further includes second number information indicating a number of the plurality of identifiers of the plurality of submeshes.

11. The method of claim 10, wherein the association information further includes information indicating whether a respective one submesh of the plurality of the submesh is completely included in a scene object associated with the respective one submesh.

12. The method of claim 8, wherein the compressed bitstream further includes 3D bounding box information specifying association between 3D bounding boxes and submeshes, and
the index of the scene object is determined based on the 3D bounding box information.

13. The method of claim 8, wherein the compressed bitstream further includes visibility cones information specifying association between visibility cones and submeshes, and
the index of the scene object is determined based on the visibility cones information.

14. The method of claim 8, wherein the association information further includes persistence information indicating whether a relationship between the scene objects and submeshes specified by the association information is persistent.

15. An apparatus for encoding a three-dimensional (3D) sub-mesh of a 3D mesh comprising:
a communication interface; and
a processor operably coupled to the communication interface, the processor configured to:
divide a base mesh into a plurality of submeshes,
encode a submesh of the plurality of submeshes independently from other submeshes,
encode a supplemental enhancement information (SEI) message including association information between scene objects and submeshes, wherein the association information includes a plurality of indices of the scene objects and a plurality of identifiers of the plurality of submeshes each being associated with a respective one index of the plurality of indices of the scene objects, and
combine the encoded submesh and the encoded SEI message into a compressed bitstream.

16. The apparatus of claim 15, wherein the compressed bitstream further includes 3D bounding box information specifying association between 3D bounding boxes and submeshes.

17. The apparatus of claim 15, wherein the compressed bitstream further includes visibility cones information specifying association between visibility cones and submeshes.

* * * * *